United States Patent [19]

Georgiev

[11] Patent Number: 5,224,689
[45] Date of Patent: Jul. 6, 1993

[54] SHOCK ABSORBING DEVICE ALLOWING REDUCING THE VEHICLE WEIGHT

[75] Inventor: Jordan V. Georgiev, Raleigh, N.C.

[73] Assignee: Jordan Valchev Georgiev, Raleigh, N.C.

[21] Appl. No.: 807,214

[22] Filed: Dec. 16, 1991

[51] Int. Cl.⁵ ............................................. B60G 13/00
[52] U.S. Cl. ..................................... 267/225; 267/168
[58] Field of Search ................. 267/168, 34, 212, 213, 267/216, 220, 224, 221, 223, 225, 226, 250

[56] References Cited

U.S. PATENT DOCUMENTS

| | | | |
|---|---|---|---|
| 2,631,841 | 3/1953 | Tillou et al. | 267/213 X |
| 3,039,758 | 6/1962 | Gratzmuller | 267/168 X |
| 3,603,610 | 9/1971 | Thompson | 267/221 X |

FOREIGN PATENT DOCUMENTS

| | | | |
|---|---|---|---|
| 20866 | 8/1956 | Fed. Rep. of Germany | 267/34 |
| 186537 | 8/1956 | Fed. Rep. of Germany | 267/225 |
| 1012219 | 7/1952 | France | 267/226 |
| 7906119 | 2/1981 | Netherlands | 267/168 |
| 1293399 | 2/1987 | U.S.S.R. | 267/168 |

Primary Examiner—Robert J. Oberleitner
Assistant Examiner—Kevin D. Rutherford

[57] ABSTRACT

A shock absorbing device is disclosed, allowing reducing the vehicle weight at least by half. The device includes a tubular housing (TH) and within it a resilient shock dampening assembly (SDS) elastically axially movable is secured, through one or more inter coiled preliminary extended tension coil springs 6 and (6a). (SDS) also is locked to (TH) by a locking ring (8), in order to preserve said preliminary extension. (SDS) includes a plurality of telescopic sections, (UTS), (ITS2), (ITS1), and (LTS), resiliently supported by a plurality of compression coil springs (1), (2), and (3), interposed between them, designed to absorb average shocks. When the greater shock forces after entirely compressing the springs reach their predetermined unlocking level, rather than bottoming, ring (8) is opened, allowing the (SDS) to extend axially upward, opposed by springs (6) and (6a). Thus the (SDS) absorbs upward extensions and prevents the shocks to the vehicle's frame which would otherwise occur when a conventional shock absorber "bottoms out," because of its limited absorbing height. Since the respective wheel overcomes the obstacle, the force of the preliminary extension of springs (6) and (6a) returns the (SDS) for locking.

12 Claims, 3 Drawing Sheets

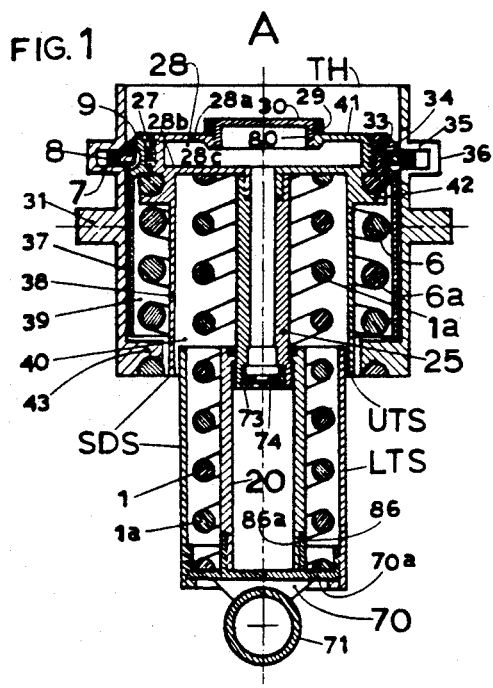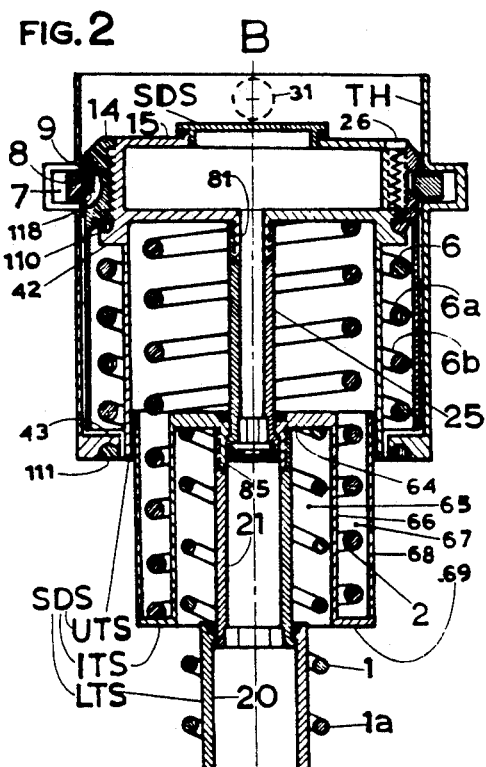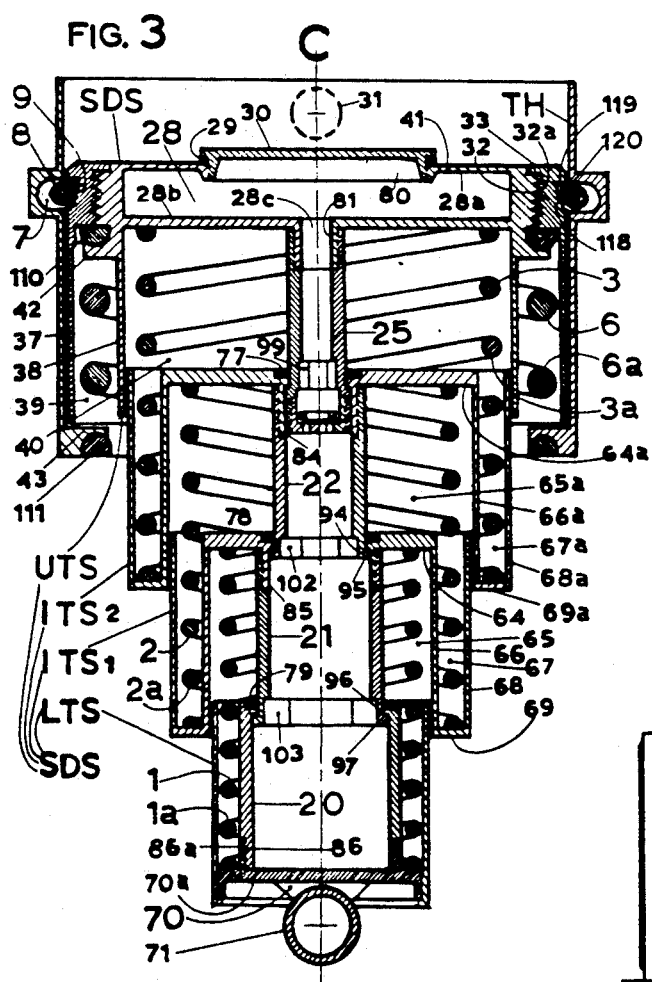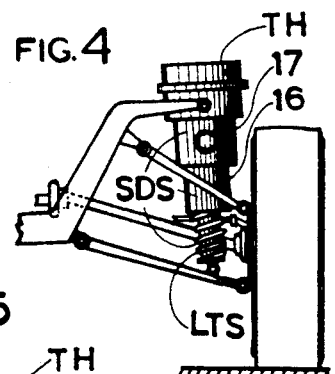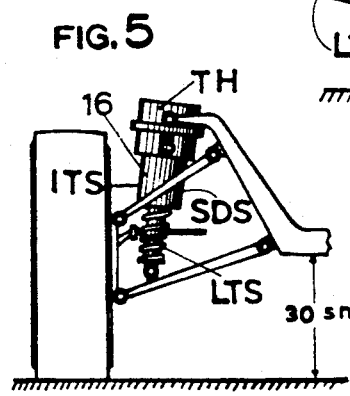

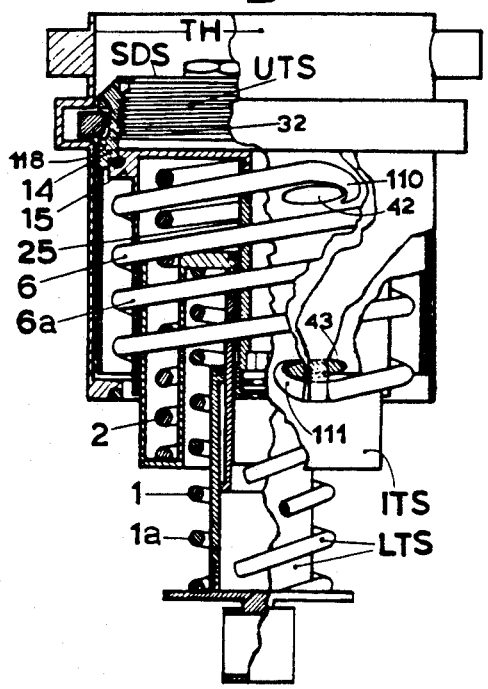
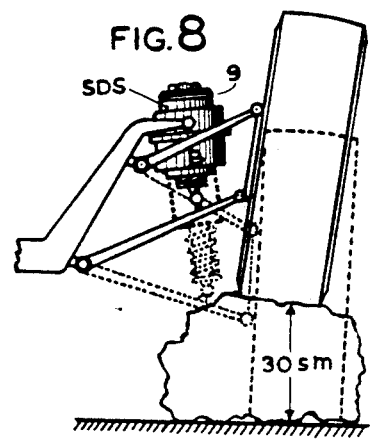
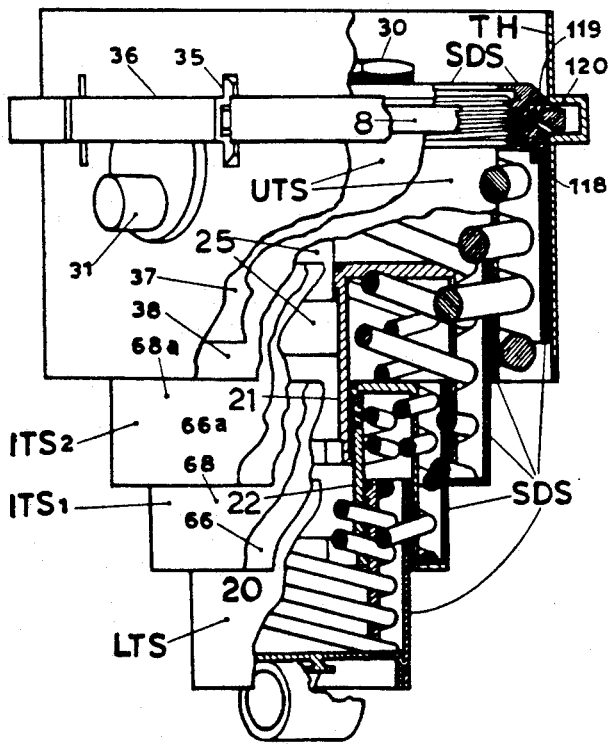
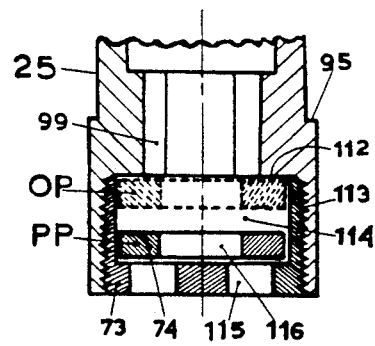
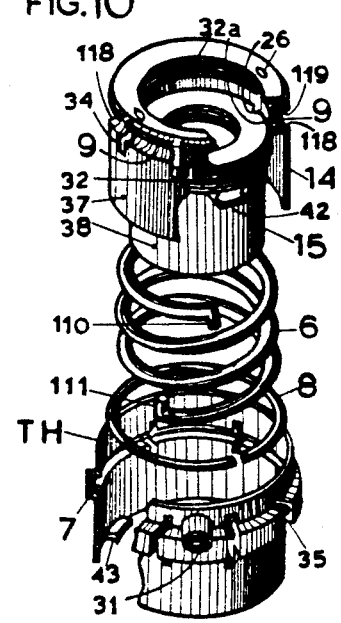

SHOCK ABSORBING DEVICE ALLOWING REDUCING THE VEHICLE WEIGHT

CROSS-REFERENCE TO RELATED APPLICATIONS

The present application is the forth one filed by me. for the same my invention. The first application I have filed on Nov. 10, 1986 under U.S. Ser. No. 06/926,446, and the Patent Office abandoned it officially for missing to respond in time to the Patent Office Official Action. The second Application I have filed on Jun. 04, 1990, under U.S. Ser. No. 07/578,821, and the patent Office abandoned it officially for missing of affidavit. The third application I have filed on May 01, 1991 under U.S. Ser. No. 07/694,297, and the Patent Office abandoned it for missing of oath. Literally the same specification I have filed in UK.

TECHNICAL FIELD

The present invention relates generally to a shock dampening means, and more particularly to shock absorbing device, for use with vehicles.

BACKGROUND ART

An acknowledged fact is that the weight of the presently used vehicles is too great, exiting their maximum payload generally more than twice. A studies for the reasons for that, definitely show the significant frame's relative strength over designation as the main one, necessary however for prevention of the frame's residual deformations. Typical especially for the present cars, is that the entire body has the function of the frame. Those studies also definitely prove that said deformations are caused by the bumps encountered in rough driving conditions, since the bottoming of the conventional shock absorbers, because of their absorbing height limitation, and the poor absorbing work of the rubber bumpers incorporated for final absorbing of the bigger shocks. Most shock absorbers in use today include two telescopic sections, one received within the other. Typical for them is that one compression coil spring is interposed between said sections, for their resilient biasing, and for absorbing the shocks tending to compress them. However, in few patents two springs are used, disposed between said sections consecutively in end to end fashion. Most of those shock absorbers also include a fluid damper, composed by a cylinder, a piston, and valve arrangement through which fluid flows to dampen vibrations. One serious drawback inherent in the existing shock absorbers however, is that for all of them there is a limit to the amount of compression which the shock absorber can undergo before it "bottoms out". To soften this, most shock absorbers include a resilient rubber bumper, however whose absorbing effect according to the practice is very poor. Nevertheless, when the shock absorber "bottoms out", the energy of the occurred bumps is transferred to the frame of the vehicle. Over time such repeated blows having strong vehicle's frame bending tendency, can lead to residual deformations in the vehicle's frame. To be avoided said deformations, the relative strength of the frame of the vehicle necessarily is over designed, so as to withstand forces as much as five times the vehicle's weight, in stationary condition. This however increases the vehicle weight, and by a corresponding amount, the size of the engine, and its gasoline consumption. The vehicle weight surpasses their maximum payload, generally by more than twice. A study of the reasons for this, definitely shows the significant over design of the vehicle frame. This over designation has been necessary to prevent residual deformation of the frame caused by bottoming of the shock absorbers. Typical especially for the present cars, as that.

DISCLOSURE OF THE INVENTION

The present invention was developed to provide lets call it "bottomless" shock absorber, capable of absorbing the shocks encountered even in the most severe driving conditions, and still enabling reducing at least by half the necessary vehicle's frame relative strength over designation, which for the cars mean reducing of the thickness of the steel sheet metal by which is made their bodies, or replacing it by aluminum sheet metal or plastics, since the entire body has the function of the frame. Said reducing is accomplished by means of a novel arrangement of telescopic sections and springs. More particularly, the shock absorber includes a tubular housing secured to the frame of the vehicle, and within it a shock absorbing assembly is disposed axially movable. Said assembly also is secured there elastically through one or more inter coiled tension coil springs, which however are preliminarily extended. Furthermore that assembly normally is locked to that housing by a split locking ring, through first deeper and second shallow annular grooves, and also is unlocked from said housing, by the excess energy of the shocks having reached greater height and strength than their preliminarily fixed unlocking level. The assembly basically includes lowest and upper telescopic sections, however for increasing the shock absorber's absorbing height, one or more intermediate telescopic sections can be interposed between said basic sections. For absorbing of the last energy of the strongest shocks, instead of bottoming over rubber, as it is by most conventional shock absorbers, said assembly being unlocked, through its upper section extends resiliently axially generally upward into the housing, and so prevents any bump. Said lowest section extends generally downward from said upper section, after each compression, mean after overcoming of each obstacle causing said compression. The lowest section is secured to the wheel's suspension system, and in respect to the upper section is based resiliently between its fully expanded and compressed positions by one or more inter coiled compression coil springs. However, in an assembly comprising additionally one or more intermediate telescopic sections, mean a plurality of telescopic sections, between each neighboring sections also are included said compressing coil springs. The assembly also is provided with a fluid damper, having respective plurality of telescopic elements, equal in number to the number of all telescopic sections. Said damper also has separate disposed fluid reservoir, formed in said upper telescopic section. As it was mentioned, the entire assembly through its upper section is locked to the housing by a resilient split locking ring in order to preserve said extension in advance of said one or more inter coiled tension coil springs. That preserving is intended to be preserved the spring returning force obtained through said preliminary extension, and also to limit the downward movement of the assembly with respect to the housing. So obtained and preserved said spring returning force is needed to return back down said assembly after each of its absorbing generally upward extension. In particular, the split locking ring tightens itself preferably around the upper section of the assembly, seated by own strength within said second annular groove, formed circumferential preferably in said section. The outer circumference of the locking ring extends into said first annular groove, formed preferably on the inner surface of said tubular housing. The second annular groove has a pushing surface which acts against the respective profiled contacting surface of the locking ring, and tends preferably to open it, being urged by the strength of the shocks having reached greater power than their predetermined opening magnitude, mean greater than their fixed unlocking strength level. This mean that when the force of each shock is greater than is needed for the compression of all compression coil springs, plus the energy needed for overcoming the opening resistance of the locking ring and its friction within the first groove, the exceeding energy of that shock through said pushing surface pushes the locking ring out of said second annular groove, mean pushing it into said first annular groove, and so opens it, and releases the subassembly for its absorbing axial upward extension within the housing. Said extension is as high as the excess energy of the respective shock is, to its full absorption, without any bumping. This upward movement is opposed by said extension in advance of said one or more tension coil springs. Each one of said springs has its generally upper end secured to said upper telescopic section, and the opposite its end secured to the lower end of the housing. After overcoming of the obstacle caused said assembly's upward extension, said spring returning force, brings back down said assembly for locking. The described variant is better then the other possible, with which I began, whose second shallow groove was formed in the housing. It is because in the described variant the locking ring is not traveling during the sub assembly's extensions. From the foregoing, it is apparent that the primary object of the present invention is to provide a shock absorber which will not "bottom out" and therefore will reduce the over designation of the frame relative strength, regarding the residual deformations, so that makes possible reducing the vehicle's weight, and the gas consumption, according to my experiments at least by half. Another object is to provide a shock absorber which by great reducing the bumps and jolts, will make the driving significantly more comfortable.

Another object is to provide a shock absorber allowing to the vehicle to pass even through areas without roads, having most severe driving conditions. Another object is to provide a shock absorber which utilizes space efficiently, by consecutive coaxial concentrically disposed coil springs, through partial overlapping of the smaller springs by the respective bigger once in fully expanded position, and total overlapping in fully compressed position. Another object of this invention is to provide a multistage fluid damper. Another object is to provide a shock absorber characterized by a durable construction capable of absorbing shocks encountered under the most severe driving conditions.

Other object is to provide about three times less acceleration's gas consumption. Other objects and advantages will become apparent after a study of the following description and the accompanying drawings.

BRIEF DESCRIPTION OF THE DRAWINGS

FIG. 1 is a section view of A embodiment, having in its assembly only the basic lowest and upper telescopic sections;

FIG. 2 is a section view of B embodiment, having in its assembly one intermediate telescopic section between its basic lowest and upper telescopic sections;

FIG. 3 is a section view of C embodiment, having in its assembly two intermediate telescopic sections between its basic lowest and upper telescopic sections;

FIG. 4 is an elevation view of C embodiment, within the wheel's suspension;

FIG. 5 is an elevation view of B embodiment, within the vehicle suspension;

FIG. 6 is a partial section view of B embodiment fully loaded;

FIG. 7 is a partial section view of C embodiment fully loaded;

FIG. 8 is an elevation view of B embodiment, with compression springs fully compressed and its assembly being unlocked by very high obstacle, is extended over the housing, without bottoming, and so preventing any bump;

FIG. 9 is a detail showing the construction of the pipe-piston and the plugging washer in its open (OP) and plugging (PP) positions;

FIG. 10, is a perspective view showing: on the bottom is the housing; over it is the locking ring; nest is one tension coil spring; over it is the extension member; and on the top is the groove member;

BEST MODES FOR CARING OUT OF THE INVENTION

Figure 11:
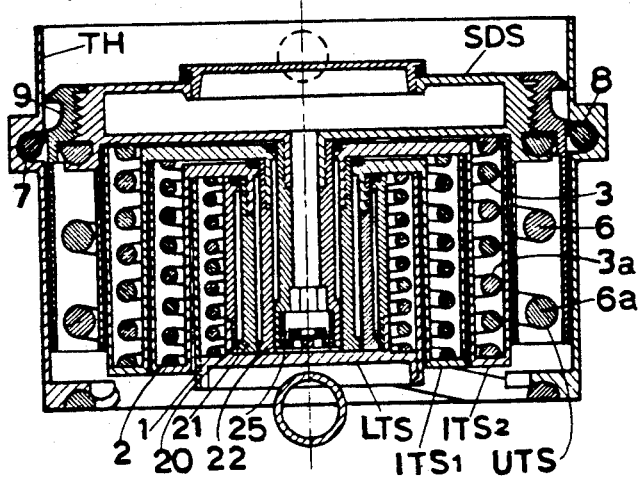
FIG. 11 is a section view of C embodiment in moment of unlocking. All compressing coil springs are respective compressed, and the locking ring is opened.

The weight of the used car(Moscvich) for experiments having replaced shock absorbers by B embodiment was 1080 kilos, plus the maximum payload of 500 kilos, its total warranted weight should be not more than 1600 kilos. Because the relative frame's strength of the made already car can not be reduced, regarding to the main effect of the present invention, the reducing of the relative frame's strength over designation was achieved to the opposite way: namely through increasing of the car's weigh to 3200, 3600, and 4000 kilos, through over loading it with sand bags.

Referring now to FIGS. 1; 2; and 3; wherein respective the first A; second B; and third C embodiments are shown. The shock absorber includes a tubular housing (TH), which basically is a piece of pipe with its upper and lower ends open, and on its outside surface has two diametrically opposed supporting pivots 31, for securing the shock absorber to the frame of the vehicle. Housing TH includes on the same its outside circumference integrally formed an annular ring 36, inside of which, and on the inside housing's circumferential surface preferably a first deeper annular groove 7 is formed, wherein a resilient split locking ring 8 is movable interposed. For facilitation the dismantling of said ring, slots 35 are formed, intersecting said ring 36 and said groove 7. At the bottom of housing TH there are two diametrically opposed spring hangers 43, preferably integrally formed with the inner surface of housing TH.

A shock dampening assembly (SDS) is axially movable interposed within housing TH, wherein also is elastically secured to that housing, through preliminary extended tension coil springs 6 and 6a, and releasable locked, through said ring 8, second shallow annular groove 9, and said first deeper annular groove 7. Said assembly SDS is composed basically of a lowest and upper telescopic sections, and also including a fluid damper. However, for increasing of the total absorbing height between said basic sections can be interposed one or more intermediate telescopic sections, as it is for B respective C embodiments, shown in FIGS. 2 and 3. Typical for said increasing is that it is with insignificant increasing of the length of the shock absorber in its fully compressed position, because the bigger section overlap the smaller entirely.

Said Upper Telescopic Section (UTS) is comprised of an extension member 15, a groove member 14, and a pipe-piston 25, moving together as a single part. Extension member 15 includes an upper portion 41 having an external thread 32. Within said portion a fluid reservoir 28 is formed, to contain the damper's fluid, especially during compressions. In the top wall 28a of said reservoir a threaded opening 80 is formed co-axial, to allow the addition of dampening fluid. A threaded cap 30 and gasket 29 seal opening 80. From the reservoir's bottom 28b a threaded collar 81 extends co-axial downward, and on it said damper's pipe-piston 25 is screwed. Throughout said collar an orifice 28c is passing also coaxial, through which the dampening fluid flows between said reservoir and the telescopic elements of the fluid damper, during respective compression or extension of assembly SDS. From the upper portion 41, a cylindrical wall 38 extends downward, open at its bottom end. Said wall 38 defines a compression cavity 40, wherein is interposed the lowly disposed telescopic section, which is axially movable therein, between its fully compressed and extended positions. Wall 38 also guides and supports that section against sideward bending, and keeps compression cavity 40 clean from mud pollution. A pair of diametrically opposed spring hangers 42 are preferably integrally formed on portion 41, adjacent to its conjuncture with wall 38. Said extended in advance tension coil springs 6 and 6a are disposed in the annular space 39, formed between said wall 38 and cylindrical wall 37 of groove member 14. The upper hooks 110 of said springs 6 and 6a engage respective spring hangers 42 of extension member 15, as can best be seen in FIG. 6. The lower hooks 111 of those springs engage said spring hangers 43, of housing TH. Thus springs 6 and 6a resist the upper extensions of sub assembly SDS with respect to housing TH, and the strength of their preliminary extension brings down back SDS for locking, after each of its absorbing generally upward extension.

Groove member 14 includes an upper portion 33 having an internal thread 32a, through which is screwed on member 15, and on its outer circumference preferably the second shallow annular groove is made. Under said groove wall 37 extends downward, bearing against the inner surface of housing TH, to guide the axial movement of sub assembly SDS within TH, and to keep locking ring 8 open and entirely into first deeper groove 7, at extension times of SDS. To assure that groove member 14 does not loosen during operation, threaded half holes 26 are formed by halves through said threads 32 and 32a, and within them securing bolts 27 are screwed. Therefore, said extension and groove members and pipe-piston 25 form the upper telescopic section as a single part.

The second shallow annular groove 9 extends preferably around groove member 14. Said groove 9 has a generally flat locking surface 119, substantially perpendicular to the axis of the shock absorber, and also has preferably an arcuate pushing surface 118. A plurality of slots 34, equal in number to slots 35, intersect sallow groove 9, being aligned by couples, slots 34 and 35 facilitate the dismantling of locking ring 8.

Said resilient split locking ring 8 through shallow groove 9 and deeper groove 7 locks the entire sub assembly SDS to housing TH, and is constructed from a high quality steel alloy, respectively hardened so as to be hard and resilient enough to tighten itself around groove member 14, seated within second groove 9, and to perform its locking and unlocking functions sufficiently. Regarding said functions, preferably the inner circumference of ring 8 preferably corresponds to the profile of the second groove 9. The outer its circumference extends preferably into first groove 7. Ring 8 includes a generally flat locking surface 120 which engages locking surface 119 of groove 9, and also includes preferably an contacting surface 121 which cooperates with the pushing surface 118 of that groove, in order to facilitate itself opening.

Figure 12:
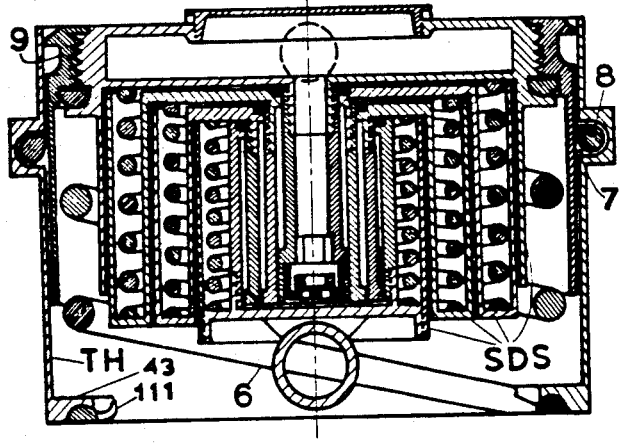
FIG. 12 is a section view of C embodiment showing the fully compressed assembly, and extended upwardly to a level even to the top of the housing.
Figure 13:
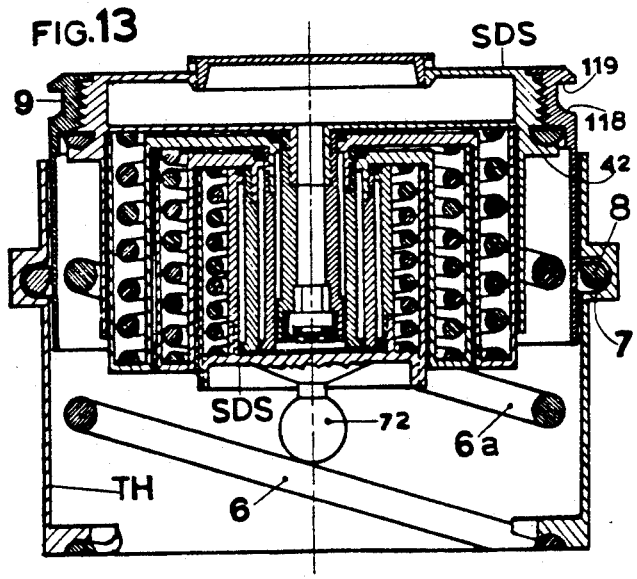
FIG. 13 is a section view of C embodiment, with assembly fully compressed and overextended over the housing, as it is shown on FIG. 8.

FIGS. 2 and 3 show cut away respective of B and C embodiments of a vehicle empty and immovable, and FIGS. 6 and 7 show respectively those embodiments in immovable, but fully loaded, vehicles. For a fully loaded moving vehicle in usual or moderately rough road conditions, for example its C shock absorbers are working between positions shown in FIG. 7, to about ⅔ of the compression shown in FIG. 11. This means the shocks created by said road conditions will be absorbed by compression coil springs 1, 2, and 3 which according to my experiments assure about three times greater absorbing height than the conventional shock absorbers. For said conventional absorbers the bumps usually occur when a vehicle is moving in rough road conditions, where the height and the strength of the shocks often are greater than the absorbing height and strength of the compression coil spring of said absorbers. As a result of that, the exiting shock's energy after the full compression of said spring is almost entirely transformed as bumps over the vehicle's frame. It is because the rubber bumpers in said shock absorbers designed for final absorbing of those strong bumps have small absorbing effect. In the present invention, in order to have much greater absorbing height through those three springs 1, 2, and 3, as the experiments showed, much greater shocks than those causing bumps in said conventional shock absorbers can have great enough height and strength to compress fully those three springs. But on extremely rough roads, which still is possible, after unlocking of SDS, said exiting shock's energy will be smoothly absorbed by coil springs 6 and 6a, without any bumps. Said springs can be extended by said exiting shock's energy as high as its magnitude is, to its full absorption. The extensions of springs 6 and 6a additionally increase considerably the total absorbing length of the shock absorber, as it is shown in FIGS. 8, 12 and 13.

Pipe-piston 25, being interposed within the lowly disposed damper's element, is screwed through its thread 81a at its upper side onto collar 81 of extension member 15. However, to form the retaining surface 87, part of its lower side diametrically slightly is enlarged and within it the cavity 114 is formed. Within said cavity plugging washer 74 is movable interposed, and over it nozzle plug 73 is screwed on threaded wall 113. Said plug has plurality in circle disposed nozzle openings 115, whose combined area equals close to the area of the plugging washer's opening 116.

Figure 14:
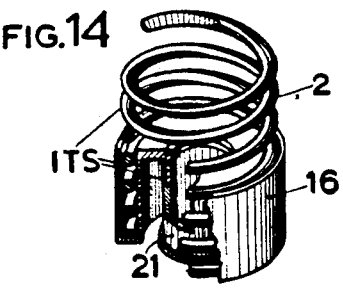
FIG. 14 is a cut-away showing intermediate telescopic section composed of a spring container; a compressing coil spring; and a damper cylinder-piston.
Figure 15:
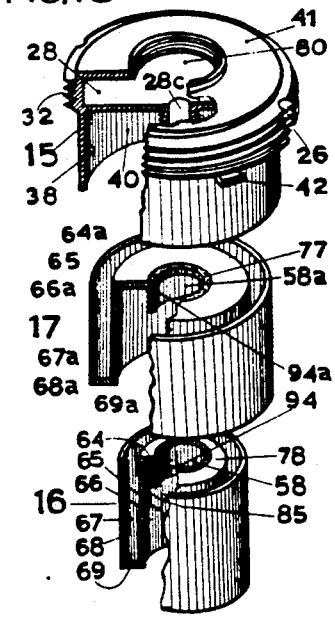
FIG. 15 is a perspective view of the spring containers of two intermediate telescopic sections, and over them is the compression member.
Figure 16:
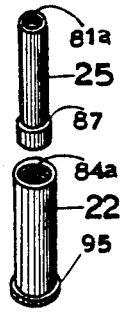
FIG. 16 is a perspective view showing the telescopic elements of the damper.

The first Intermediate Telescopic Section (ITS 1) includes spring container 16, compression coil spring 2, and damper cylinder-piston 21 (FIG. 14), which move as a single unit. Spring container 16 includes a washer like top wall 64 having a central opening 58, through which and throughout seal 78 the lower portion of pipe-piston 25 extends into cylinder-piston 21. Under seal 78 threaded collar 85 extends downward from top wall 64, surrounding opening 58. Said collar has larger and smaller internal diameters, between which retaining surface 94 is formed, which engages retaining surface 87 of pipe-piston 25 (FIG. 16), to retain spring container 16. Said container also includes cylindrical walls 66 and 68, which are coaxial and concentric to collar 85 and to each other, and their lower ends are connected by a washer like bottom wall 69. Thus those three walls define an annular spring compressing space 67, wherein compression coil spring 2 is inserted and during compressions compressed. Inner wall 66 being attached at its upper end to the periphery of top wall 64, at its lower end is open, and so is formed compression cavity 65, wherein the lower telescopic section (LTS) is receivable, between its fully extended and compressed positions. Damper cylinder-piston 21 (FIG. 16) through its thread 85a on its upper side is screwed onto said collar 85 (FIG. 15). Part of the lower side of damper cylinder-piston 21 is diametrically slightly enlarged and thus the retaining surface 97 is formed, for retaining of the lowest telescopic section, through cylinder 20. The ITS is movable between the extended position shown in FIGS. 2 and 3, and the compression position shown in FIGS. 6, 7, 13, and 14, in which its spring container 16 and itself are disposed entirely within compression cavity 40 of extension member 15, for B embodiment, or in compressing cavity 65a of spring container 17, for C embodiment. Spring container 16, forming said intermediate telescopic section in B embodiment is supported under it, by compression coil spring 1, and over it, itself supports the section's compression coil spring 2. The upper side of said spring 2 extends into compression cavity 40, and bears against bottom 28b, supporting the upper telescopic section. The lower side of said spring extends into space 67, and bears against bottom wall 69 of container 16.

The Lowest Telescopic Section (LTS) comprises connecting member 70, compressing coil spring 1, and damper cylinder 20. Into cylinder 20 is inserted as a piston cylinder-piston 21, and through its retaining surface 97 retains cylinder 20 by its retaining surface 96, and thus is retained the entire lowest telescopic section. The upper end of cylinder 20 includes an annular groove for inserting seal 79. At its lower side cylinder 20 includes thread 86a, through which is screwed on threaded collar 86 of connecting member 70. Member 70 includes hub 71 or boll 72 (FIG. 13) for securing the shock absorber to the suspension system of the wheel; flange-plate 70a; and said internal threaded collar 86. The lowest telescopic section is movable between the extended position shown in FIG. 2 and a compressed position, in which cylinder 20 is disposed entirely within compression cavity 65, as well as compressing coil spring 1, shown in FIGS. 11-13. The lowest telescopic section is supported resiliently by said spring 1, whose upper side extends into compression cavity 65, and bears against top wall 64 of container 16. The lower side of spring 1 is supported by flange-plate 70a.

Referring now to FIGS. 3 and 7, C embodiment is shown therein. It includes all the elements used in B embodiment. However, C embodiment includes a second intermediate telescopic section (ITS 2), which comprises a second spring container 17, second damper cylinder-piston 22; and third compression coil spring 3, all of them identical to those in the first intermediate telescopic sections (ITS 1), used in B and C embodiments, differing only by their respective greater sizes.

Within compression cavity 65a of container 17 spring container 16 and compression coil spring 2 are interposed, mean disposed is there the first intermediate telescopic section. Instead passing through container 16, as it is by B embodiment, pipe-piston 25 by C embodiment is passing through container 17, which is axially movable within cavity 40, between its extended position, shown in FIG. 3, and its compressed position, shown in FIGS. 11-13. Said container 17, mean the second intermediate telescopic section is supported resiliently between its fully extended and fully compressed positions: over it, by its spring 3; and under it, by spring 2. The upper side of said spring 3 extends into cavity 40, and bears against the bottom of reservoir 28. The lower side of spring 3 extends into space 67a, and bears against bottom wall 69a of container 17. In B embodiment through container 16 passes pipe-piston 25, but in C embodiment passes cylinder-piston 22. And said section is axially movable within cavity 65a, between the extended position shown in FIG. 3, and the compressed position shown in FIGS. 11-13. Container 16 is supported resiliently between its fully extended and fully compressed positions: under it, by spring 1, over it, itself supports spring 2. In C embodiment the upper side of spring 2 extends into cavity 65a, and bears against the top wall 64a of container 17, and its lower side, extends into space 67, the same as it is in B embodiment. The remainder of C embodiment, including cylinder-piston 21, cylinder 20, spring 1, and connecting member 70, are identical to those in B embodiment.

It is a particular advantage of this invention, that compression coil springs 1, 2, and 3, which resiliently support individual telescopic sections of SDS, are coaxially concentrically consecutively arranged, however, not in end to end fashion, as it is by the conventional shock absorbers, but so that in extended position the lower side of spring 3 overlaps the upper side of spring 2, whose lower side overlaps the upper side of spring 1, and in compressed position spring 3 entirely overlaps spring 2 which the same entirely overlaps spring 1.

Thus, the total absorbing height of all the compression coil springs in this invention is about three times greater than in conventional shock absorbers, and at the same time its length in normal position is not more than half longer than A embodiment, but in fully compressed positions is only insignificantly longer. However in normal condition C embodiment even is shorter than the conventional shock absorbers, and is much shorter in fully compressed position.

Figure 17:
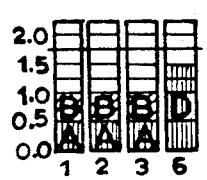
FIG. 17 is a graph illustrating of the load on the springs as shown in FIG. 7.

In the preferred embodiments the opening resistance of locking ring 8 and its opening friction in the first deeper groove, as an example is just less than 0.25 times the shock absorbers' Respective Share of the Total Vehicle Weight (RSTVW). Since the predetermined unlocking level of the shocks is 1.75 RSTVW, and springs 1, 2, and 3 are fully compressed at 1.8 RSTVW, sub assembly SDS will be released just prior of the time when said springs are fully compressed. Said springs of a fully loaded but stationary vehicle will be compressed to the position shown in FIG. 6 for B embodiment and FIG. 7 for C embodiment. Tension coil springs 6 and 6a will not however be extended yet by said load, since the force generated by their advanced extension is 1.5 greater than the RSTVW. During normal operation of the vehicle, sub assembly SDS will be locked by locking ring 8. When the wheel meets a hole, or hits a stone or other obstacle, typical for moderate rough roads, springs 1, 2, and 3 will be compressed to the height of the obstacle, and so the force of the blow will be absorbed by those springs. When the obstacle has the respective great height, and the shock which it causes has reached strength 1.5 times the RSTVW, springs 1, 2, and 3 are compressed to the level when the force generated by the advanced extension of springs 6 and 6a is overcome, and the pushing surface 119 of shallow groove 9 begins to push locking ring 8, within first deeper groove 7. The graph of FIG. 17 shows that the unlocking strength of the shocks having said exiting height and energy are predetermined to about 1.75 of the Respective Shared Total Vehicle's Weight (RSTVW), in which is included the strength needed for respective compression of springs 1, 2, and 3, plus the strength needed for overcoming of the locking ring 8 opening resistance, mean its self tight strength, and also its friction with groove 7 of housing TH. Only shocks having more than said above height and strength are able to push that ring 8 through pushing surface 118 out of second groove 9, into the first groove 7, to open it, and thus to release the assembly SDS, for its absorbing generally upward movement. FIG. 11, depicts that moment. After absorbing of that shock, mean after the wheel passes the obstacle causing said shock, the strength of springs 6 and 6a, and especially the strength of their preliminary extension, meaning their elastic returning force pulls back down the assembly, until second groove 9 reaches ring 8, which by own strength at once inserts itself into second groove 9, and thus the locking is completed.

On FIG. 12 sub assembly SDS is even with the top of housing TH, and on FIG. 13 it is substantially beyond, gradually responding to about 2.75 RSTVW. However, in reality, according to my experiments, even in the highest extension, the extension strength level never reaches more than 2 times RSTVW. It is because the unlocking level equaling to 1.75 RSTVW, is greater that the preliminary extension of springs 6 and 6a, equaling around 1.5 RSTVW. Only this can explain why a car moving at fifty kilometers speed, overcomes the same easily 10 cm. high logs, only with springs 1 and 2 (for B embodiment), and 15 cm. high diametrical split logs, with extension of sub assembly SDS.

Vibration and jounce are controlled by dampening fluid, which fills damper cylinder 20, cylinder-pistons 21 and 22, as well as pipe-piston 25, and 1/6 till 1/5 of the depth of reservoir 28. When SDS begins to compress, the dampening fluid is forced through holes 115 of nozzle plug 73. The pressure of the dampening fluid moves plugging washer 74 up against surface 112 to its open (OP) position. This allows relative high rate of fluid flow from the damper's elements into reservoir 28. When the shock absorber begins to expand, the fluid is drawn back, through the holes of nozzle plug 73, into said elements. However, the fluid current moves back down plugging washer 74 to its (PP) plugging position, and because its central opening 116 (FIG. 9) covers as an example only one-ninth of the total opened surface of nozzle's holes 115, the passing fluid in quantity is about ten times smaller, which actually is the dampening.

From the foregoing it is apparent that springs 1, 2, and 3 absorb the majority of shocks to the vehicle. When those springs are fully compressed, rather than "bottoming out," the assembly is freed and begins to move axial upward within housing TH. This upward extension is resisted by tension springs 6 and 6a, whose preliminary extension brings back down assembly SDS after the overcoming of the obstacle, and ring 8 locks it to the housing TH. According to my many experiments, because of the great absorbing length of springs 1 and 2 (for B embodiment), on moderate rough roads the unlocking of SDS may never happened. However, for very bad road it is there, and its existence permits for the vehicle constructors to calculate the frame relative over designation around 2, maximum 2.5, but not more than 5. Plus that, the great absorbing length makes not only exceptionally great comfort, but also makes the vehicle much more able to pass through areas without roads.

Figure 18:
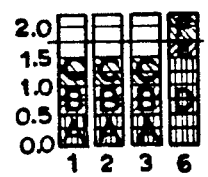
FIG. 18 is a graph illustrating of the load on the springs as shown in FIG. 11.

FIGS. 17 and 18 represents as follow: the numbers along the vertical axis represent the ratio of compression or extension of the respective springs. As an example number "1" indicates the shared part of the RSTVW, number "2" indicates doubled RSTVW. The numbers along the horizontal axis indicate respective springs. For example, "2" indicates spring 2. The letters in the vertical columns represent: (A), the preliminary compressions of springs 1, 2, and 3; (B), the full load of the vehicle; (C), the full compressions of said springs; (D) the preliminary extension of springs 6 and 6a; (E), the opening resistance and the friction of the locking ring; combined D and E, the predetermined unlocking strength level of the shocks, and (F); the absorbing extension of SDS.

INDUSTRIAL APPLICABILITY

The shock absorbers of the present invention consists comparatively many parts, but all of them are simple cylindrical shaped, and cheap for production. That parts complication however practically is insignificant compared to the revolutionary effect proven through many experiments. Regarding especially the weight reducing, capitalized through the great gasoline millage; great comfort; great ability to move practically everywhere; etc. I strongly believe shortly after the first use of A or B or C shock absorbers, a car without some of them will be not possible be sealed.

The assembly of the shock absorber requires a special press and special pulling devices. Member 15 is first inserted into said press. Next, the upper end of spring 3 is inserted into cavity 40, and container 17 is placed over it, but after inserting of seal 77 in its groove. Spring 2 is then inserted into cavity 65a, and container 16 is inserted over it, but also after inserting of seal 78 in its groove. Next spring 1 is inserted into cavity 65, and all of these parts are compressed. After inserting of seal 79 in its groove, cylinder 20 is inserted into cavity 65 of container 16. Cylinder-piston 21 is then inserted through cylinder 20, and screwed on collar 85, through hexagon 103, by an Allen wrench. Next cylinder-piston 22 is inserted through cylinder-piston 21 and tightened on collar 84 of container 17, through its hexagon 102. Similarly the pipe-piston 25 is inserted through cylinder-piston 22, and tightened onto collar 81 of extension member 15, using its internal hexagon 99. After that plugging washer 74 is inserted into space 114, and over it nozzle plug 73 is screwed on thread 113. Finally after pulling up cylinder 20, member 70 is screwed on it, and thus the assembly is assembled.

After releasing from the press, that assembly will expand to the position shown on FIG. 3. It should be noted that even in that expanded position, springs 1, 2, and 3 are not fully expanded. It is desirable to maintain a preliminary compression on said springs equal to approximately one-half of the RSTVW. Being preliminary inter-coiled since extension in special device and U shaped tools and cords keeping that extension springs 6 and 6a are next hung by their hooks 110 on spring hangers 42, using special finger like tools. Groove member 14 is then screwed onto extension member 15, and secured by inserting bolts 27 into the aligned respective half holes 26. So already assembled SDS is then inserted into housing TH, wherein the split locking ring 8 is already inserted into the first deeper groove 7, and that housing also is already inserted into said special pulling device. After engaging of the lower hooks 111 of springs 6 and 6a within spring hangers 43, the pulling member of the pulling device should be screwed in thread 80 of extension member 15. When so-pulled SDS reaches ring 8, the chamfer of member 14 presses it into the deeper groove, and so opens it. The pulling continues until groove 9 reaches groove 7, when ring 8 inserts itself into groove 9. Finally, the shock absorber is assembled, and after taking it out of the pulling device, seal 29 is placed and plug 30 should be screwed in thread 80, after the filling of the damper's fluid.

It is known that the shock absorbers of a car loaded only by the driver, work harder than the fully loaded. That difference is more conspicuous for the work of the truck's shock absorbers. However, according to the possibilities of this invention, said above uncomfortable difference can be easy eliminated, simply by arrangement of different strength of said compression coil springs. It is easily possible because all those springs are retained through respective damper elements, and because all damper's elements are also retained through the spring containers. The main effect of this invention, namely eliminating the necessity of very strong vehicle's frame creates great possibility for reducing the vehicle's weight. For example through replacing the two times stronger steel by however four times lighter aluminum, and by plastics.

By this way the weight of a new middle class car can be reduced from about 800 kilos, to around 300 kilos. Plus 500 kilos maximum payload, the total car weight instead of about 1300 kilos, will be around 800 kilos. If shock absorbers made by B embodiment are used, the preliminary extension of springs 6 and 6a for each shock absorber should be ¼ of 1200 kilos, each spring 1 should be fully compressed on around ¼ of 800 kilos, and its preliminary compression should be around ¼ of 400 kilos. Each spring 2, should be compressed to unlocking level on around ¼ of 1300 kilos, and its advanced compression should be around ¼ of 600 kilos. Said above mean that for a car loaded only with the driver, on which load condition is more than 60% of the total car's mileage will work mostly the much softer spring 1, and when that car is loaded with four people, will work the much stronger spring 2. For C embodiment said possibility is even greater. For example being used in a sport car having reduced weight around 400 kilos, and maximum payload around 500 kilos, the total car weight will be 900 kilos. The preliminary extension of springs 6 and 6a of each shock absorber should be ¼ of 1350 kilos, each spring 1 should be fully compressed on around ¼ of 800 kilos, and its advanced compression should be around ¼ of 400 kilos. Each spring 2, should be fully compressed on around ¼ of 1100 kilos, and its advanced compression should be around ¼ of 600 kilos. Each spring 3, should be compressed to unlocking level on around ¼ of 1450 kilos, and its advanced compression is around ¼ of 900 kilos. This means that a car loaded only with the driver, will work only soft spring 1. For load of two-three people, it will work mostly spring 2, and for full load, will work mostly the strongest spring 3. Said above arrangements make possible significant increasing of the driving comfort with load only the driver, and also allow additional reducing of the vehicle's weight.

As it is understandable the elimination of the bumps makes possible the reducing of the frame's relative strength over designation more than half. This allows for the car manufacturers to reduce the thickness of the steal sheet metals, or as it was mentioned replacing of the heavy steel with the four times lighter aluminum or plastics. That mean the weight of the vehicle can be reduced the same by more than half. The reduction in vehicle's weight will allow a corresponding reduction in the engine size, in the cost of the vehicle, in the cost of its exploitation, in its maintenance, and most important, reducing of the gasoline consumption. Not less important also is that about four times less is the gasoline consumption at the time of acceleration, since the weight of the vehicle twice is less. This is very important especially for city driving, because of the often stops. It is important also regarding the less air pollution, especially in the big cities. When most of the vehicles become with reduced weight, since the effect of this invention, because of the respective smaller kinetic energy for both vehicles, the happened collisions will be not that much heavy, and, not that much deadly.

The present invention may of course be carried out by ways other than those specified here without departing from the spirit and essential characteristics of the invention. The present embodiments are, therefore, to be considered in all respects as illustrative and not restrictive, and all changes occurring within the meaning and equivalency range of the appended Claims are intended to be embraced therein.

I claim:

1. A shock absorbing device for a motor vehicle, interposed between a frame of a vehicle and a suspension of a respective wheel, comprising:

a tubular housing;

means for securing said device to the frame;

a ring formed on the outer surface of said housing, said ring having a first annular groove means and wherein a locking means is movably interposed in said first annular groove means;

at least one resilient telescopic assembly having at least one upper section and at least one lower section axially movably disposed within said housing;

said resilient telescopic assembly having a fluid damper means coaxially disposed at least partially within said telescopic assembly;

a second annular groove means disposed on said at least one upper section such that said first groove means and said second groove means are generally aligned;

said locking means being normally disposed between said first and said second groove means, releasably securing said telescopic assembly to said tubular housing;

said locking means unlocking and releasing said telescopic assembly from said housing when a predetermined amount of axial force acts on said telescopic assembly; and means for elastically securing said telescopic assembly to said housing, in order to resiliently oppose and absorb forces tending to extend said telescopic assembly in an upward direction, and said elastic securing means providing a restoring force tending to align said first and said second groove means and thereby lock said locking means.

2. The shock absorbing device of claim 1, wherein said means for elastically securing said telescopic assembly to said tubular housing comprises at least one tension coil spring, having on both its ends means for securing; said coil spring being interposed and secured between said housing and said assembly and preliminarily extended to obtain a lock restoring force.

3. The shock absorbing device of claim 2, wherein at least one securing means is disposed adjacent the bottom of said tubular housing, to secure said preliminarily extended at least one tension coil spring to said housing.

4. The shock absorbing device of claim 2, wherein at least one securing means is disposed below said second annular groove means for securing said preliminarily extended at least one tension coil spring to said upper section of said telescopic assembly.

5. The shock absorbing device of claim 2 wherein after an unlocking, said lock restoring force returns said assembly back down after an upward extension, in order to adjust said first and second groove means to the same level, so that said locking means partially re-enters into said second groove means, to accomplish the locking.

6. The shock absorbing device of claim 1, wherein said telescopic assembly comprises at least one intermediate section, interposed between said upper and said lower sections of said telescopic assembly, to increase the absorbing height of said device; and said intermediate section comprising a resilient means, and means for supporting said resilient means, and also cylinder-piston means.

7. The shock absorbing device of claim 6, wherein said means for supporting of said resilient means comprises a spring container adapted for containing and supporting at least one compression coil spring, and for securing of said cylinder-piston means; comprising:

an outer cylindrical guiding wall, adapted to guide the spring container within a cavity of the upper section;

an inner cylindrical wall, interposed concentrically within said outer wall, and being generally equal in length to said outer wall;

a washer like top wall, closing the upper end of said inner wall;

an opening, formed in said top wall, through which the piston means of the upper section passes;

a threaded collar, extends downwardly co-axially from a lower side of said top wall, and surrounds a downward extension of said opening;

a retaining surface is defined between two different diameters of said opening's extensions;

an annular groove is formed in an upper side of said opening to accommodate a seal, within said groove;

a compressing cavity, formed by said inner and top walls, and a bottom side of the cavity is open so that within said cavity at least one lower section is entirely receivable and axially movable therein, at the time of compressions, between fully extended and compressed positions;

a washer like bottom wall connects lower ends of said cylindrical walls, and supports said compressing coil spring;

an annular spring compressing space is defined between said two cylindrical walls and said bottom wall, wherein said coil spring is interposed and compressed during compressions of said assembly.

8. The shock absorbing device of claim 7, wherein between said cylinder means and said piston means of said damper means at least one said cylinder-piston means is interposed, being attached to the intermediate section, so that a lower disposed damper element is a cylinder in which said cylinder-piston means is received as a piston, said cylinder-piston means is in turn a cylinder wherein an upper disposed damper element is interposed as a piston, in order to increase the absorbing height of said fluid damper means and said assembly, making said assembly multistaged.

9. The shock absorbing device of claim 1, wherein said fluid damper means comprises at least one cylinder means, each one having at least one piston means; a fluid reservoir means for storing a dampening fluid; a plugging washer movably interposed in a cavity of said piston means, to allow variable fluid flow through said piston means; and a nozzle plug mounted adjacent to said cavity, to support said washer, in order to permit its dampening function.

10. The shock absorbing device of claim 1, wherein said locking means includes a resilient split locking ring made from a metal alloy and said locking ring is received in only one of said annular grooves during unlocking and partially received in both said annular grooves during locking.

11. The shock absorbing device of claim 1, wherein said upper section comprises:

said second annular grove means, adapted for inserting of said locking means, in order to accomplish said locking of said section to said housing;

a fluid reservoir, to contain dampening fluid;

a collar, adapted to secure said piston means to said upper section;

an orifice, to hydraulically connect said reservoir to the sections of the telescopic assembly;

at least one means for securing said elastic securing means to said upper section;

a cavity, for receiving said at least one lower section;

at least one cylindrical guiding wall, extending downward from the bottom of said reservoir, defining said cavity, and biasing said locking means entirely into said first groove means while unlocking, said guiding wall is also adapted for guiding said upper section in said housing, and for guiding said at least one lower section into said cavity.

12. The shock absorbing device of claim 1, wherein each lower section of said resilient telescopic assembly is at least partially axially receivable within the upper section, in order to decrease the height of said device in a fully compressed position.

* * * * *